UNITED STATES PATENT OFFICE.

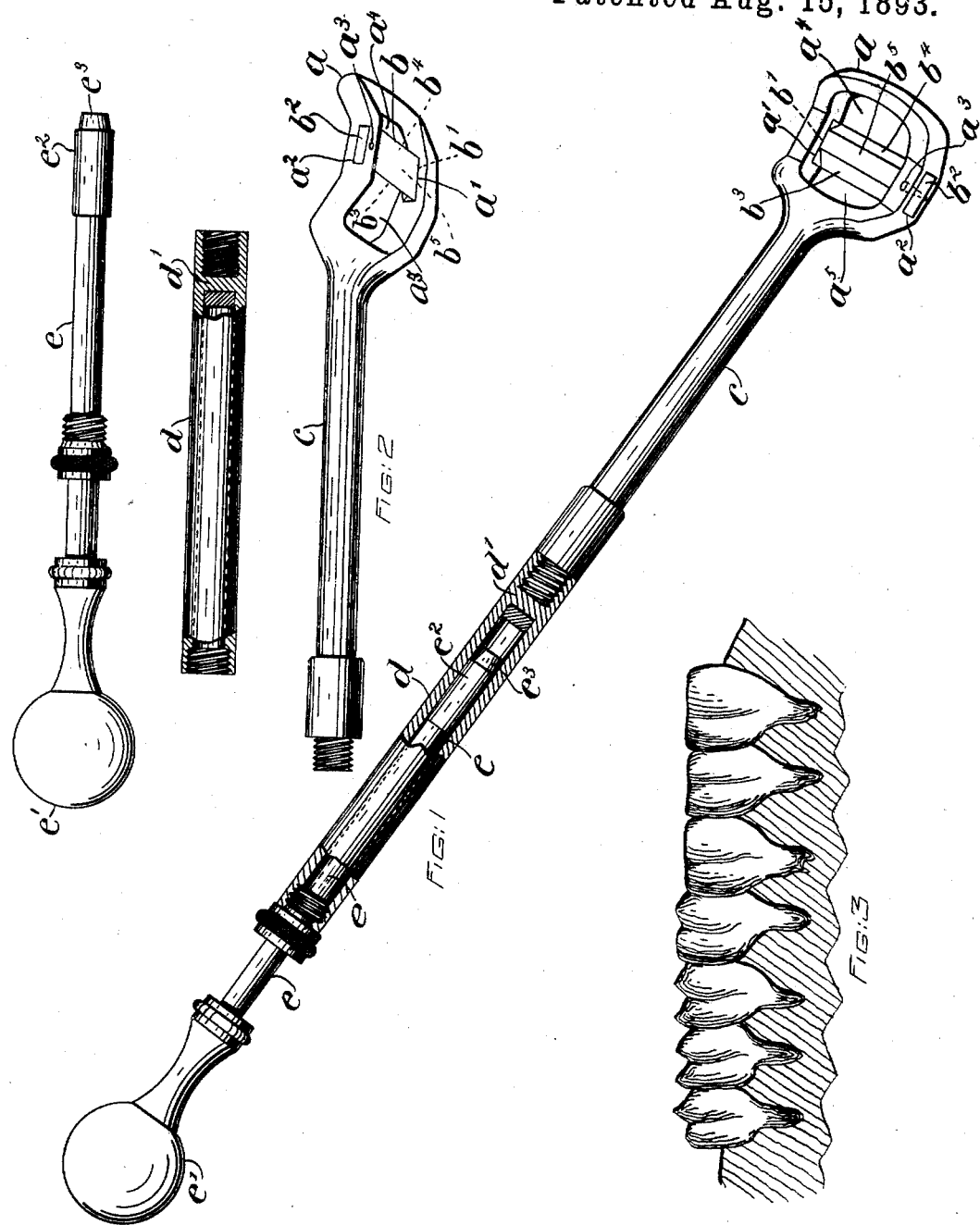

GEORGE W. TEUFEL, OF PHILADELPHIA, PENNSYLVANIA.

VETERINARY TOOTH-CUTTER.

SPECIFICATION forming part of Letters Patent No. 503,298, dated August 15, 1893.

Application filed May 22, 1893. Serial No. 475,008. (No model.)

*To all whom it may concern:*

Be it known that I, GEORGE W. TEUFEL, a citizen of the United States, residing at the city of Philadelphia, in the county of Philadelphia and State of Pennsylvania, have invented certain new and useful Improvements in Animal-Tooth Shaping and Planing Tools, of which the following is a specification.

My invention has relation to a portable tool for shaping and planing off the surfaces of the teeth of animals, such as horses, mules and the like; and it relates more particularly to the construction and arrangement of a tool for such purposes.

It is well known that the teeth of animals by constant grinding thereon in masticating food wear off in such manner as to cause portions thereof to become peaked and in some instances with the sensitive dentine of the teeth exposed producing what is known as toothache, which interferes with the feeding of the animal, as well as causing the same to become irritable and thus interfering with the working thereof. Hitherto in the peaking of the teeth of animals such as horses, mules and the like, they have been shaped or planed off simply by inserting a file or similar implement into the jaw of the animal, but this mode of treating such teeth has proven a tedious method of relieving an animal of its misery and especially in view of the fact that it is a more or less difficult matter to maintain an animal's mouth open long enough to effect the required filing operation so as to uniformly shape and restore the same to their normal condition.

The principal objects of my invention are first, to provide a simple, durable and efficient portable implement adapted to be inserted into the mouth of animals for shaping and planing off peaked or wolf teeth produced by the constant grinding of the teeth against each other in masticating food, whereby the teeth of an animal may be readily given their required shape and the animal afforded thereby comfort, not only in feeding but also in working; second, to provide a detachable or sectional implement for shaping and planing off peaked or wolf teeth of horses, mules and the like; and third, to provide a portable tooth shaping and planing off tool.

My invention consists of a detachable implement for shaping and planing off the peaked or pointed portions of the teeth of animals provided with a beveled edge or chisel blade mounted in a bearing plate or seat having a stem or rod provided with a barrel having an internal anvil and a plunger adapted to engage against the anvil.

My invention further consists of a sectional animal tooth shaping and planing tool, comprising a rod having formed integral therewith a recessed skeleton seat for the reception of a detachable beveled double edge blade and a barrel removably secured to the stem or rod and with a plunger afforded a range of movement through the same, for expeditiously removing the required part or portions from the tooth in its forward movement in contact with the tooth and in its rearward movement adapted to effect the planing off of the same.

My invention further consists of an implement for shaping and planing the teeth of animals, constructed and arranged substantially in the manner hereinafter described and claimed.

The nature and general characteristic features of my invention will be more fully understood from the following description taken in connection with the accompanying drawings forming part hereof; and in which—

Figure 1, is a perspective view of an implement for shaping and planing off the teeth of animals, embodying the features of my invention. Fig. 2, is a detached view of the implement illustrated in Fig. 1, showing the general construction of the several parts thereof and this view serving to illustrate how the device is detached in order to occupy comparatively small space, when not in use; and Fig. 3, is a front elevational view of a series of teeth in which certain of them serve to illustrate the effect of the implement upon them and the others showing the result of constant grinding which produced the peaked or pointed condition at certain parts or portions thereof.

Referring to the drawings $a$, is a skeleton recessed and flaring seat or bearing plate having oblong openings $a'$ and $a^2$, in the side-walls thereof for the reception of a beveled double edge blade $b$, provided with shanks $b'$ and $b^2$, adapted to fit snugly into the oblong openings in the side walls $a'$ and $a^2$, of the seat $a$, and with a stud-pin $a^3$, inserted through the wall of the seat $a$, and one of the shanks $b'$, of the blade $b$, for holding the same firmly to position. This blade $b$, is preferably constructed in the manner illustrated in Figs. 1 and 2, with two beveled surfaces $b^3$ and $b^4$, and with an intermediate plain top surface $b^5$, for permitting of the removed matter or substance to be afforded a clearance in either direction of the operation of the device.

$c$, is a stem or rod formed integral with the seat $a$, and provided with a threaded upper extremity engaged by a barrel $d$, provided with an internal partition forming an anvil $d'$.

$e$, is a plunger or rod provided with a knob $e'$, and with a milled stud-screw adapted to engage the upper end of the barrel $d$, and to limit the range of movement of the plunger or rod $e$, within the barrel $d$. This plunger or rod $e$, at its lower end is provided with a collar $e^2$, recessed to form a cylindrical bumper $e^3$, adapted to engage with the anvil $d'$, in the back and forth movement of the plunger or rod $e$. The force of the blow produced by the rapid movement of the plunger bumper $e^2$, against the anvil $d'$, of the barrel $d$, enables the chisel or blade $b$, in contact with a tooth, to rapidly and effectually chip off the required peaked or pointed portion thereof and a clearance therefore is afforded by the provision of the space $a^4$, in the seat $a$, in the forward movement of the plunger or rod $e$, of the device and in the rearward movement of the device through the space $a^5$.

In some instances it is desirable to employ the implement for the purposes designated as illustrated in Fig. 1, while in others it is preferable to use the same in somewhat the position illustrated in Fig. 2, that is, face down; in either instance the required clearance is afforded through the spaces $a^4$ and $a^5$, for removed matter.

It will be manifestly obvious that as to minor details modifications may be made, for example, in the construction and arrangement of the skeleton seat forming the bearing plate or frame for the beveled double chisel blade cutter or severing device $b$, adapted to shape and to plane an animal's tooth, without departing from the spirit of my invention.

Having thus described the nature and objects of my invention, what I claim as new, and desire to secure by Letters Patent, is—

1. The combination, in a veterinary cutter, of a rod provided with a flaring skeleton seat or holder having a double beveled edge blade and an operating device therefor, substantially as and for the purposes set forth.

2. The combination, in a veterinary cutter, of a rod provided with a skeleton seat or holder having a detachable blade or cutter, a barrel applied to said rod and having an anvil mounted therein, and a plunger provided with a bumper adapted to engage with the anvil of said barrel, substantially as and for the purposes set forth.

3. The combination, in a veterinary cutter, of a rod provided with a slotted holder having a beveled edge blade detachably connected therewith, a barrel provided with an anvil and a detachable back-stop and a plunger afforded a range of movement in said barrel, substantially as and for the purposes set forth.

In testimony whereof I have hereunto set my signature in the presence of two subscribing witnesses.

GEORGE W. TEUFEL.

Witnesses:
THOMAS M. SMITH,
RICHARD C. MAXWELL.